Aug. 26, 1969     M. J. HARE     3,463,137

JIG FOR PRECISION REFRACTORY CUTTING

Filed Oct. 3, 1966

INVENTOR.
MAURICE J. HARE
BY
Mason, Mason & Albright
ATTORNEYS

3,463,137
JIG FOR PRECISION REFRACTORY CUTTING

Maurice J. Hare, Parkesburg, Pa., assignor to Lukens Steel Company, Coatsville, Pa., a corporation of Pennsylvania
Filed Oct. 3, 1966, Ser. No. 583,782
Int. Cl. B28d 7/04, 1/02
U.C. Cl. 125—35    5 Claims

ABSTRACT OF THE DISCLOSURE

A jig for holding a workpiece to be precision cut including a frame with rollers that can be moved relative to a stationary saw. A V-shaped holder is mounted on a plate and can be rotated to turn same about a vertical axis. The holder can be tilted and locked in position. The plate can be also traveled along rods on the frame to further adjust the position of the holder and workpiece.

---

This invention relates to a jig for holding a workpiece for precision cutting. More particularly, the present invention is a jig designed to hold workpieces, such as refractory bricks, in various positions so that a stationary saw can be used to shape the bricks to almost any desired configuration.

It will be appreciated that refractory bricks used in furnaces have intricate shapes, particularly those bricks used in furnace roofs. Further, many bricks must be precisely tailored when individual bricks are replaced. Previously such bricks were shaped from blanks having the conventional rectangular configuration by wedging the blanks at a calculated angle in a workpiece holder. However, much time and waste was experienced due to slipping and to incorrectly aligned bricks.

It is the object of the present invention to overcome past deficiencies and to provide a jig which can be easily adjusted so that bricks of any desired configuration can be shaped in cooperation with a stationary saw.

Figure 2:
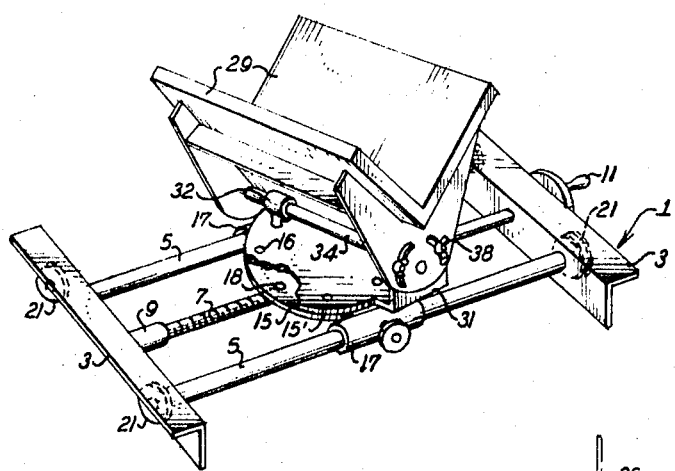
FIG. 2 is a perspective top view of the jig showing the workpiece holder mounted on a base plate.
Figure 1:
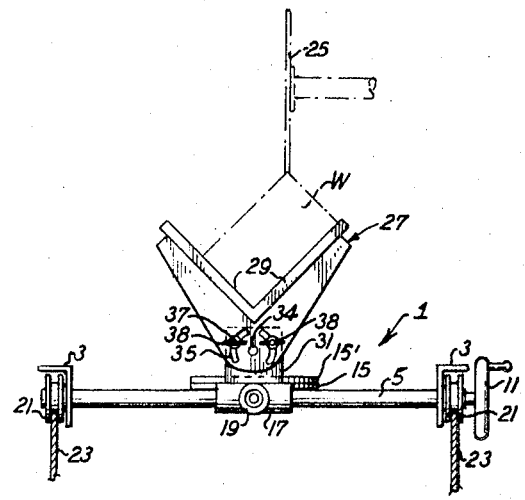
FIG. 1 is a front elevation showing the jig holding a brick for movement relative to a stationary saw.
Figure 3:
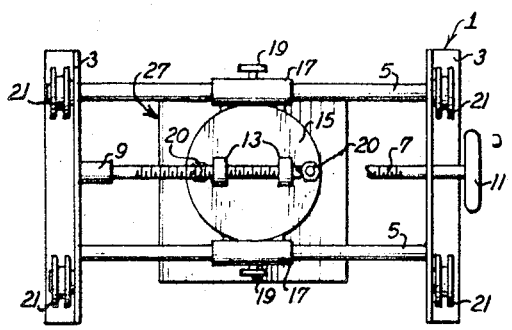
FIG. 3 is a bottom plan view of FIG. 2.

As seen in FIG 1, the jig 1 has a frame including a pair of L-bars 3 which house the ends of rod members 5 and intermediate threaded rod member 7. As best seen in FIGS. 2 and 3, rod 7 is journalled in a cylindrical fitting 9 at one side of the frame and connected to crank 11 at the other end of the frame.

Referring now to FIG. 3, threaded rod 7 receives coupling means 13 in the form of threaded fittings which are integrally connected to a base plate 15. Rotation of crank 11 causes base plate 15 to travel along the rod member 7. At opposite sides of base plate 15, a pair of sleeves 17 receive rod members 5 and a conventional screw lock 19 is mounted on each sleeve so that upon rotating the screws, the screw studs pass through sleeves 17 to bear against the rod members 5 and the position of the base plate is held in fixed position.

Rollers 21 are mounted on L-bars 3, preferably adjacent the ends of rod members 5. Rollers 21 are designed to travel along rims 23 of a table which is fixed relative to a stationary saw 25. In general, it is the preferred arrangement to move the jig towards the saw once the workpiece W has been properly aligned and positioned. However, an alternative arrangement is one in which the jig is locked to rims 23 and the saw moved relative to the workpiece.

A V-shaped holder 27 having sides 29 which converge towards base plate 15 is rotatably mounted on the base plate. The base plate 15 has two cylindrical flat sections with aligned holes 16 and 18 which receive one or more bolts 20 so that rotation of the top plate relative to the bottom plate varies the V-shaped holder 27 position assumed relative to the stationary saw.

An upright support 31 is affixed to the top plate 16 of base plate 15 and preferably a second support 32 is affixed to the opposite side of the same plate. A rod 34 passing through each support is fitted in each end of holder 27 whereby the holder is rotatable about rod 34 and thus the holder can be tipped from side to side. In order to lock the holder in position, arcuate slots 35 are provided in the holder to receive bolts 37 which are passed through holes in support 31. Wing nuts 38 are provided to lock holder 27 relative to support 31 and plate 15.

It will be apparent that a workpiece W can be mounted in holder 27 and the position of the workpiece, together with the holder, can be moved in any direction relative to a stationary saw 25. Thus a rectangular brick, for instance, can be accurately positioned in the manner shown in FIG. 1 by positioning the base plate transversely with crank 11. Thereafter, the holder can be rotated about a vertical axis and locked in place with bolts 20. The brick W can then be tipped to the desired angle by swinging holder 27 about rod 34 and locked in place with wing nuts 38. Then the entire jig 1 is rolled along rims 23 towards the saw and shaping of the brick is accomplished.

The foregoing detailed description has been given for clearness of understanding only, and no unnecessary limitations should be understood therefrom, for modifications will be obvious to those skilled in the art.

I claim:

1. A jig for holding a workpiece for precision cutting comprising a frame mounted on rollers for movement to and from a stationary saw, said frame comprising at least one rod member mounted transversely to the normal direction of travel of said frame, said rod member being threaded to receive coupling means on a base plate, means for rotating said threaded rod member to travel said base plate along the length of said rod member, a V-shaped holder for supporting a workpiece rotatably mounted on said base plate, said holder being comprised of a pair of sides with substantially flat opposing surfaces which converge towards said base plate, locking means for adjustably connecting said holder to said base plate whereby said holder may be tipped to vary the position of a workpiece held by said holder relative to said saw, said base plate comprising two substantially flat sections, the lower flat section being connected to said rod member and the upper flat section connected to said holder and being rotatable with respect to said lower flat section.

2. The jig of claim 1, wherein said flat sections are round plates which can be locked to one another whereby the relative rotation of said plates is prevented.

3. The jig of claim 1, wherein a plurality of substantially parallel rod members support said base plate and said first mentioned rod member is an intermediate rod member, said base plate having a sleeve mounted on either side thereof, said sleeves slidably receiving two of said rod members, one on either side of said intermediate rod member and further locking means for retaining said sleeves in fixed position on said rod members.

4. The jig of claim 3 wherein said holder is pivotally swingable about a substantially horizontal rod held by support means connected to said base plate and said first mentioned locking means is comprised of arcuate slot means in said holder which receives a retaining member affixed to said support means.

5. The jig of claim 1 wherein said rollers are adapted to travel along the rims of a table which supports said saw.

References Cited

UNITED STATES PATENTS

| | | | |
|---|---|---|---|
| 1,477,219 | 12/1923 | Halvorsen | 269—60 |
| 2,695,015 | 11/1954 | Cooper | 269—55 X |
| 2,890,693 | 6/1959 | Evans | 269—55 X |
| 2,969,231 | 1/1961 | Mills | 269—69 |

FOREIGN PATENTS 249,672   5/1948   Switzerland.

ROBERT C. RIORDON, Primary Examiner

J. F. McKEOWN, Assistant Examiner

U.S. Cl. X.R.

269—60, 69